United States Patent
Kimoto et al.

[11] Patent Number: 6,112,388
[45] Date of Patent: Sep. 5, 2000

[54] EMBOSSED METALLIC FLAKELETS AND METHOD FOR PRODUCING THE SAME

[75] Inventors: Hiroyuki Kimoto, Susono; Masatugu Nakanishi, Numazu; Akira Kato, Mishima; Yoshihiro Yamamura, Nagoya; Yukio Okochi, Toyota; Takatoshi Katsumata, Susono, all of Japan

[73] Assignee: Toyota Jidosha Kabushiki Kaisha, Tokyo, Japan

[21] Appl. No.: 09/104,376

[22] Filed: Jun. 25, 1998

[30] Foreign Application Priority Data

| Jul. 7, 1997 | [JP] | Japan | 9-181367 |
| Mar. 25, 1998 | [JP] | Japan | 10-096698 |

[51] Int. Cl.$^7$ .................................................. B21D 33/00
[52] U.S. Cl. .............................. 29/17.3; 156/209; 156/219
[58] Field of Search ............................. 29/17.3; 156/209, 156/219, 247, 344; 427/250, 277, 435; 241/1, 5, 29

[56] References Cited

U.S. PATENT DOCUMENTS

| 2,839,378 | 6/1958 | McAdow . |
| 3,765,940 | 10/1973 | Hentzschel . |
| 4,154,901 | 5/1979 | Sigsbee . |
| 4,321,087 | 3/1982 | Levine et al. . |
| 4,754,012 | 6/1988 | Yoldas et al. . |
| 4,758,003 | 7/1988 | Goldstein et al. . |
| 4,971,841 | 11/1990 | Panush et al. . |
| 5,116,703 | 5/1992 | Badesha et al. . |
| 5,325,580 | 7/1994 | Gruber et al. . |
| 5,480,231 | 1/1996 | Sasaki et al. . |
| 5,500,311 | 3/1996 | King et al. . |
| 5,624,076 | 4/1997 | Miekka et al. . |
| 5,650,248 | 7/1997 | Miekka et al. . |
| 5,672,410 | 9/1997 | Miekka et al. . |
| 5,849,369 | 12/1998 | Ogawa . |
| 5,851,602 | 12/1998 | Law et al. . |
| 5,980,992 | 11/1999 | Kistner et al. . |

FOREIGN PATENT DOCUMENTS

| 55-160060 | 12/1980 | Japan . |
| 5-232853 | 9/1993 | Japan . |
| 6-24199 | 2/1994 | Japan . |
| 6-51682 | 2/1994 | Japan . |
| 8-502301 | 3/1996 | Japan . |
| 8901016 | 2/1989 | WIPO . |

*Primary Examiner*—David P. Bryant
*Assistant Examiner*—Eric Compton
*Attorney, Agent, or Firm*—Oliff & Berridge, PLC

[57] ABSTRACT

Embossed metallic flakelets have high damage resistance and can be produced readily. A method for production is also provided. The embossed metallic flakelets are produced by dip-coating an organic-inorganic composite layer 12 on upper and lower sides of a carrier layer made of a PVA film or the like by a sol-gel process, and pressing an original embossed pattern 14 having an embossed pattern against the organic-inorganic composite layer 12 under pressure to transfer the embossed pattern onto the organic-inorganic composite layer 12. A sample having the transferred embossed pattern is sintered, to form a metallic film 10 on the organic-inorganic composite layer 12 by deposition or the like. The organic-inorganic composite layer 12 is dip-coated on the metallic film 10 by a sol-gel process, they are sintered, the carrier layer is dissolved in water to separate the metallic film 10 which is held between the organic-inorganic composite layers 12 on the upper and lower sides of the carrier layer, and the separated metallic film 10 is pulverized into embossed metallic flakelets.

8 Claims, 12 Drawing Sheets

EMBOSSED METALLIC FLAKELETS AND METHOD FOR PRODUCING THE SAME

BACKGROUND OF THE INVENTION

1. Field of the Invention

The invention relates to embossed metallic flakelets to be used as a material for a hologram pigment and a method for producing the same.

2. Description of the Related Art

Conventionally, embossed metallic flakelets are known as a material for a hologram pigment to show different colors depending on viewing direction. For example, Japanese National Stage Laid-Open Publication No. Hei 8-502301 discloses a method for producing a metallic flake pigment with an embossed pattern. According to this disclosed method, on an embossed pattern formed on the surface of a carrier sheet is formed a release surface which is embossed so to follow the embossed pattern, a metallic film is adhered to the release surface so to form the embossed pattern on it, and the release surface is dissolved to remove the metallic film from the carrier sheet. The prepared metallic film with the embossed pattern is pulverized into metallic flakes with the embossed pattern.

However, the above-described conventional production method does not form any protective film on the embossed metallic film, and when the metallic film is finely pulverized, it is probable that the embossed pattern formed on the metallic film might be lost. Also, the embossed surface might be damaged. Accordingly, it is not a practically established technology as the method for producing embossed metallic flakelets.

SUMMARY OF THE INVENTION

In view of the problems described above, the invention was completed to provide embossed metallic flakelets with high damage resistance which can be produced readily, and to provide a method for producing such flakelets.

In order to achieve the above object, according to a first aspect of the invention, embossed metallic flakelets have an organic-inorganic composite layer formed on at least one side thereof.

According to a second aspect of the invention, the organic-inorganic composite layer of the embossed metallic flakelets is formed by a sol-gel process. In the embossed metallic flakelets, the organic-inorganic composite layer formed by the sol-gel process has substituted metal alkoxide in a mixing ratio of 10 to 90% with respect to metal alkoxide.

A method for producing embossed metallic flakelets may comprise a step of forming an embossed pattern on an organic-inorganic composite layer, a step of forming a metallic film on the embossed pattern, and a step of forming an organic-inorganic composite layer on the metallic film, while another method for producing embossed metallic flakelets comprises a step of forming an embossed pattern on a metallic film, and a step of forming an organic-inorganic composite layer on at least one side of the metallic film having the embossed pattern.

In the method for producing embossed metallic flakelets, the step of forming the embossed pattern on the metallic film may be a step of pressing an original embossed pattern onto the metallic film.

The step of forming the embossed pattern on the metallic film may be a step of forming a metallic film on the surface of the original embossed pattern by plating.

Also, the step of forming the organic-inorganic composite layer on at least one side of the metallic film having the embossed pattern may include a step of applying an adhesive tape to the metallic film having the embossed pattern to fix the metallic film, and a step of dipping the fixed metallic film into an organic-inorganic composite solution to form the organic-inorganic composite layer on the metallic film.

In the method for producing embossed metallic flakelets, the step of forming the organic-inorganic composite layer on at least one side of the metallic film having the embossed pattern may also include a step of oxidizing the surface of the metallic film having the embossed pattern, and a step of forming an organic-inorganic composite layer on the oxidized surface.

DESCRIPTION OF THE PREFERRED EMBODIMENTS

Embodiment 1

Figure 1:
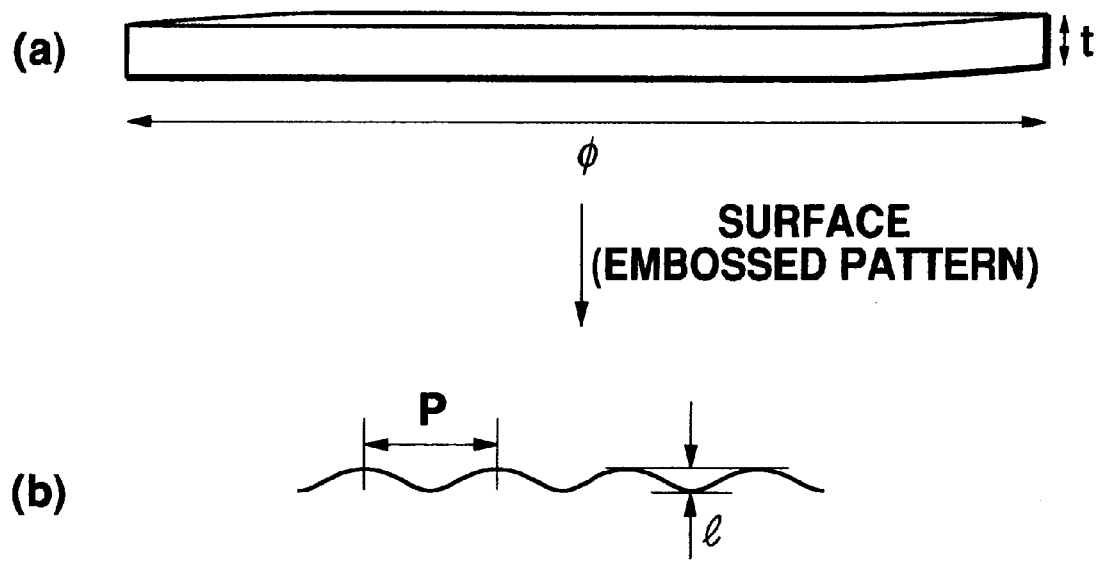
FIG. 1a is a diagram showing an example of metallic painting pigment.
FIG. 1b is an explanatory diagram of an embossed pattern formed on the surface of a metallic painting pigment.

FIG. 1(a) shows an example of a particle of the metallic painting pigment used for metallic painting of a vehicle. The pigment for metallic painting has a particle size; an average diameter $\phi$ of about 20 $\mu$m and a thickness t of about 0.1 to 0.3 $\mu$m. If the pigment particles have a larger size, they are observed like dust on a coated surface. Therefore, where a hologram pigment is used to paint a vehicle, it is preferable to form an embossed pattern on the metallic pigment as shown in FIG. 1(a). FIG. 1(b) shows an example of the embossed pattern. The embossed pattern preferably has a pitch P of 1 $\mu$m or below and a height 1 of 0.2 $\mu$m or below.

Figure 2:
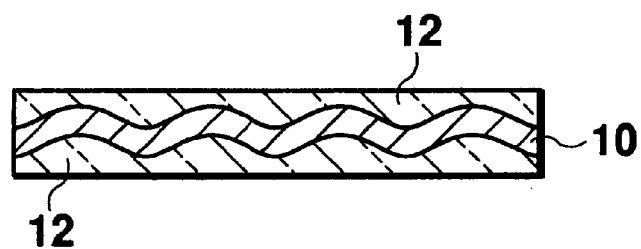
FIG. 2 is a sectional view of an embossed metallic flakelet according to Embodiment 1 of the invention.

FIG. 2 shows a sectional view of a metallic flakelet with the above-described embossed pattern according to this embodiment. In FIG. 2, an organic-inorganic composite layer 12 is formed as a protective layer on the upper and lower sides of a metallic film 10 having the embossed pattern. This configuration prevents the embossed pattern from being lost when the metallic film 10 is finely divided, because the organic-inorganic composite layer 12 serves as the protective layer. Accordingly, the metallic film 10 can be finely divided with ease. Also, the organic-inorganic composite layer 12 can be adjusted to have appropriate hardness in order to improve damage resistance of the embossed metallic flakelets.

The organic-inorganic composite layer 12 is prepared by dipping according to a sol-gel process using a sol for an organic-inorganic composite layer, which is prepared by mixing metal alkoxide represented by $M(OR)_n$ (M is a metal, and R is an organic group) and substituted metal alkoxide $R\text{-}M(OR)_{n-1}$ with its alkoxyl group partly replaced by an organic group, adding alcohol, water, acid and the like to the mixture to prepare a solution, and hydrolyzing and dehydrating the solution to condense it.

A mixing ratio of the substituted metal alkoxide to the metal alkoxide is 10 to 90% in molar ratio, and more preferably 20 to 80%. When the substituted metal alkoxide has a smaller molar ratio, the organic-inorganic composite layer 12 becomes hard, but when it has a larger molar ratio, the organic-inorganic composite layer 12 becomes soft. Therefore, when the organic-inorganic composite layer 12 is desired to have a higher damage resistance, a mixing ratio of the substituted metal alkoxide to the metal alkoxide is preferably adjusted to a molar ratio of 30% or less.

Figure 3:
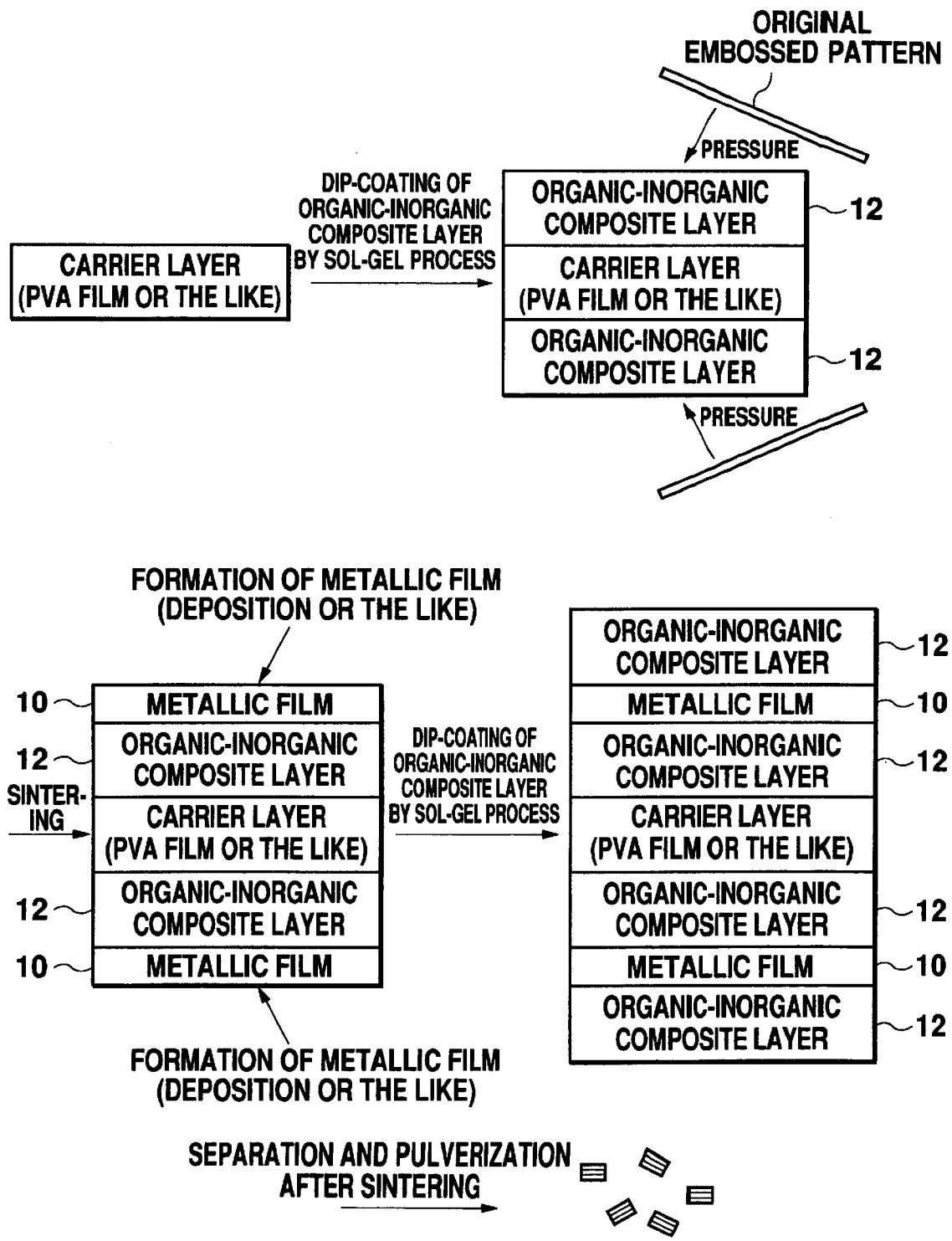
FIG. 3 is an explanatory diagram showing a method for producing embossed metallic flakelets according to Embodiment 1 of the invention.

FIG. 3 shows a method for producing embossed metallic flakelets according to this embodiment. In FIG. 3, a water-soluble film such as a PVA film is used as a carrier layer, and the organic-inorganic composite layer 12 is dip-coated on the upper and lower sides of the carrier layer by the sol-gel process. An embossed pattern is transferred to the organic-inorganic composite layer 12 by pressing, and the embossed organic-inorganic composite layer 12 is sintered. A roller press can also be used to transfer the embossed pattern onto the organic-inorganic composite layer 12. Also, an original embossed pattern 14 for the pressing process has an embossed pattern formed in advance. When it is desired that a transfer efficiency of the embossed pattern from the original embossed pattern 14 to the organic-inorganic composite layer 12 and a reflection intensity unique to a hologram are enhanced, it is preferable to increase the mixing ratio of the substituted metal alkoxide to the metal alkoxide to 70% or more in order to make the organic-inorganic composite layer 12 soft.

A metallic film 10 is then formed on the organic-inorganic composite layer 12 having the transferred embossed pattern by metallizing, plating or the like, an additional organic-inorganic composite layer 12 is formed on the metallic film 10, and the prepared layer is sintered. Thus, a metallic strip sample, which has the upper and lower sides of the embossed metallic film 10 protected with the organic-inorganic composite layer 12, is formed on the upper and lower sides of the carrier layer. The laminated layer is immersed in water to dissolve the carrier layer into water, and the two metallic strip samples are separated from both sides of the carrier layer. The two metallic strip samples are finely pulverized to obtain the embossed metallic flakelets according to this embodiment.

The embossed metallic flakelets are determined to have the organic-inorganic composite layer 12 in a thickness of 0.1 m or more. Thus, the organic-inorganic composite layer 12 serves as the protective layer satisfactorily. Also, to prevent the organic-inorganic composite layer 12 from separating after formation, the sol for the organic-inorganic composite layer is preferably determined to have a viscosity of 2.3 mpa.s or below.

To improve the transfer efficiency of the embossed pattern to the organic-inorganic composite layer 12 in the transfer process of the embossed pattern by pressing as shown in FIG. 3, the applied pressure is preferably prevented from being absorbed by the carrier layer. Therefore, the carrier layer is not made of a soft material such as a PVA film, but preferably of a more rigid material such as metal or glass, though it then becomes necessary to use ultrasonic waves or the like to separate the metallic strip samples from the carrier layer. As compared with the case of using the PVA film as the carrier layer, the separation of the metallic strip samples is somewhat difficult. Therefore, to facilitate the separation of the carrier layer from the samples and to improve the transfer efficiency of the emboss pattern onto the organic-inorganic composite layer 12 by pressing, the carrier layer is preferably prepared by coating the base plate, which is made of a rigid material such as metal or glass, with a water-soluble film such as a PVA film.

When an organic material is used instead of the organic-inorganic composite material to sandwich the above-described metallic film 10, it is hard to keep the embossed pattern transferred in the above-described transfer process because the organic material has excessive elasticity. Also, there is a disadvantage that a complex process is required to keep the formed embossed pattern. And, since the organic material has low hardness, it has a disadvantage that the formed film is easily damaged. On the other hand, when an inorganic material is used, it is quite difficult to transfer an embossed pattern by pressing because the inorganic material is excessively rigid. Therefore, holographic reflection cannot be made.

The disadvantages described above can be remedied by using the above-described organic-inorganic composite layer 12. In other words, a film having appropriate elasticity and hardness can be prepared by adequately adjusting the mixing ratio of the substituted metal alkoxide to the metal alkoxide, and a holographic reflection intensity and damage resistance can be improved. In order to have the holographic reflection intensity and the damage resistance of the organic-inorganic composite layer 12 in good balance, the mixing ratio of the substituted metal alkoxide to the metal alkoxide is preferably determined to, for example, about 30 to 70% in molar ratio.

Descriptions will be made of experimental examples of embossed metallic flakelets prepared according to the above-described embodiment.

EXAMPLE 1

Tetraethoxysilane (TEOS) and methyltriethoxysilane (MTEOS) were used as metal alkoxide and substituted metal alkoxide, respectively. These were mixed with ethanol (EtOH), water ($H_2O$), and hydrochloric acid (HCl) in the following molar ratio.

TEOS:MTEOS:EtOH:$H_2O$:HCl=0.5:0.5:6:11:0.1

The mixture was aged to have a sol with a viscosity of 2.0 mPa.s and dip-coated on a stainless steel base plate to form an organic-inorganic composite layer. The organic-inorganic composite layer was varied to have a thickness in a range of 0.05 to 0.3 μm by adjusting a pull-up velocity.

An Ni plate having an embossed pattern on its surface was pressed against the organic-inorganic composite layer to transfer the embossed pattern. The organic-inorganic composite layer having the embossed pattern and formed on the stainless steel base plate was sintered in a kiln. Next, an Al layer was formed on the organic-inorganic composite layer by deposition, and the aforementioned sol was dip-coated on the Al layer to the same thickness as the layer having the transferred embossed pattern so to form the organic-inorganic composite layer. The obtained layer was then sintered to produce a metallic strip sample.

Figure 4:
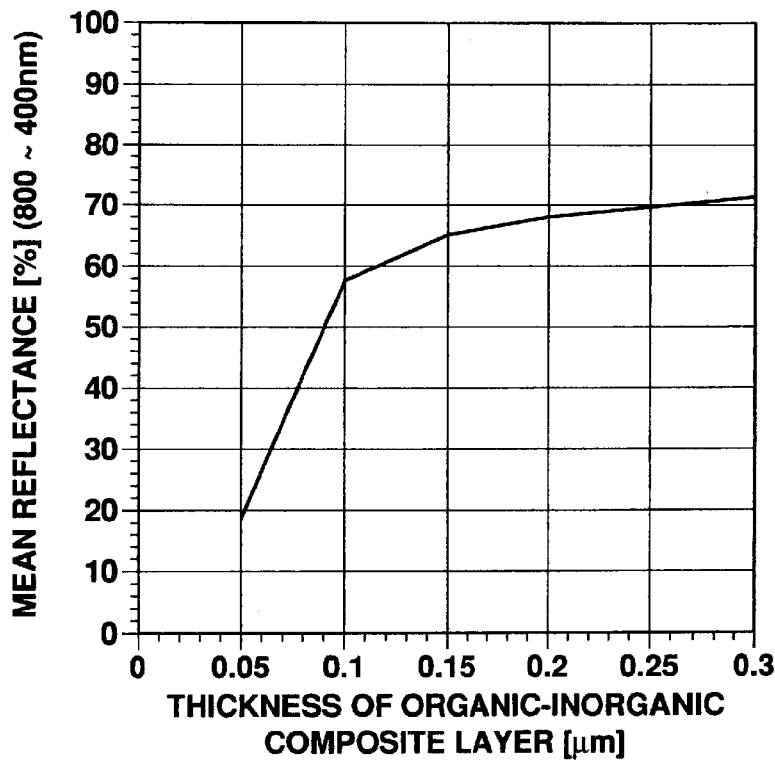
FIG. 4 is a diagram showing a relationship between a thickness and mean reflectance of an organic-inorganic composite layer.

Using the metallic strip samples with respective thicknesses prepared as described above, a 12-degree reflection was measured. The results are shown in FIG. 4. In FIG. 4, the horizontal axis indicates the thickness of the organic-inorganic composite layer and the vertical axis indicates the mean reflectance of 12-degree reflection. It is apparent from FIG. 4 that when the organic-inorganic composite layer has a thickness of 0.1 μm or below, the embossed pattern is not transferred effectively because reflectance is very low. Therefore, the organic-inorganic composite layer is desired to have a thickness of 0.1 μm or more.

EXAMPLE 2

Figure 5:
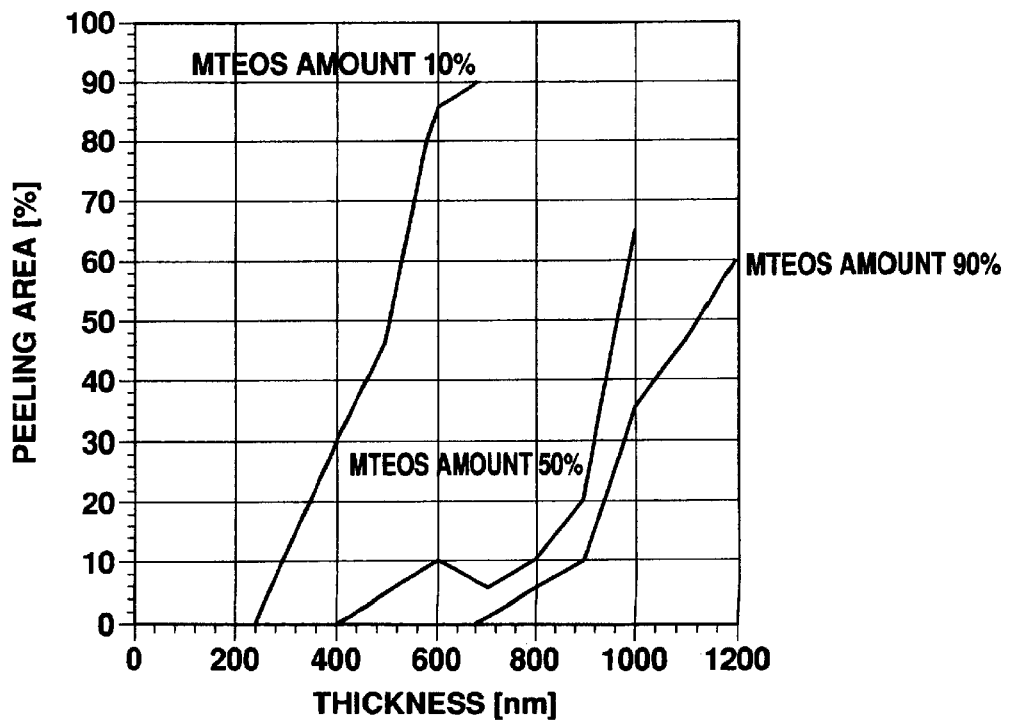
FIG. 5 is a diagram showing a relationship between a thickness and a peeling area of an organic-inorganic composite layer.

The organic-inorganic composite layers were prepared according to the same procedure as in Example 1 with a mixing ratio of MTEOS to TEOS varied variously. A relationship between a thickness and a peeling area were examined on each organic-inorganic composite layer. The results are shown in FIG. 5. In FIG. 5, the horizontal axis indicates the thickness of the organic-inorganic composite layers, and the vertical axis indicates a peeling area with respect to each thickness. It is apparent from FIG. 5 that the film peeling was very serious when the amount of MTEOS was 10% and the film thickness was around 500 nm (0.5 μm) or more, when it was 50% and the film thickness was around 800 nm (0.8 μm) or more, and when it was 90% and the film thickness was around 1000 nm (1.0 μm).

Figure 6:
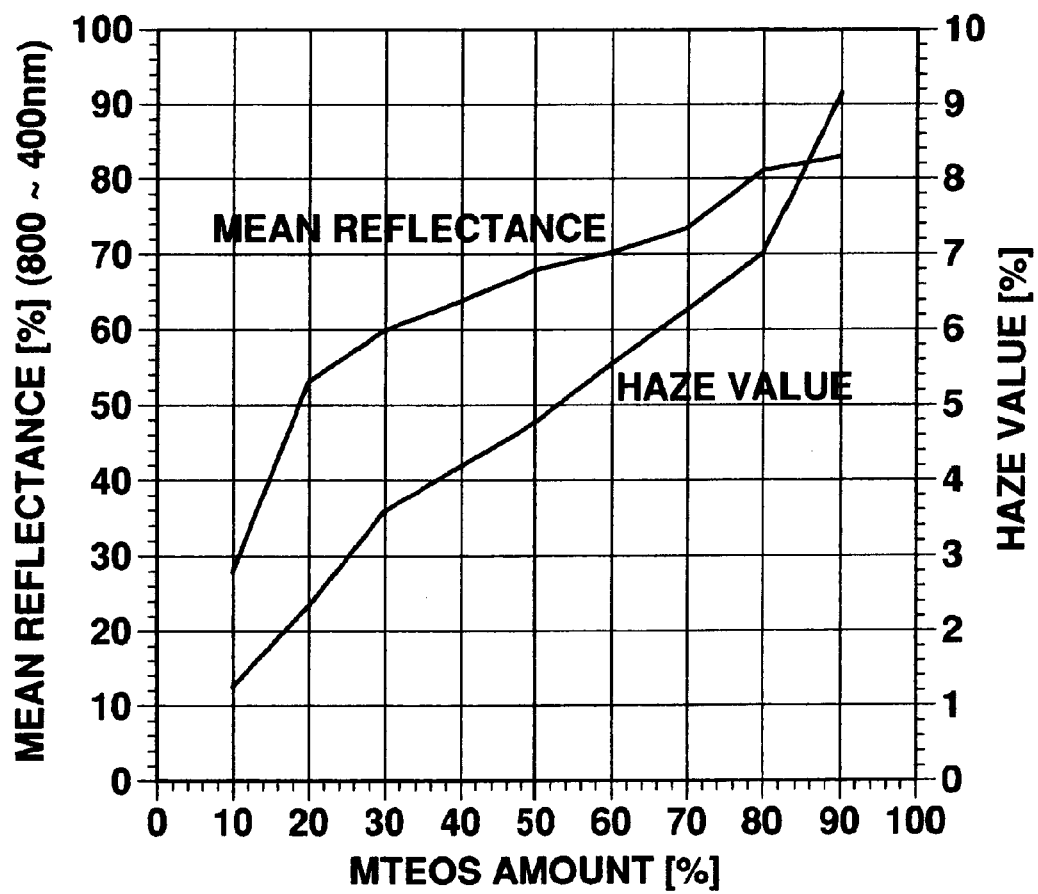
FIG. 6 is a diagram showing a relationship between an amount of MTEOS and mean reflectance.

Samples were formed on a glass base plate by the same procedure as in Example 1 except that the organic-inorganic composite layer had a thickness of 0.3 μm and the amount of MTEOS was varied. The samples were evaluated on 12-degree reflection and damage resistance. For damage resistance, a Taber abrasion test was conducted according to JIS-R3212 to determine a haze value after 100 revolutions, with the results shown in FIG. 6. The horizontal axis indicates the amount of MTEOS (a mixing ratio of MTEOS to TEOS) and the vertical axis indicates mean reflectance and haze value with 12-degree reflection. It is apparent from FIG. 6 that the mean reflectance lowered sharply when the amount of MTEOS was 20% or below, and that the haze value increases sharply and the damage resistance was degraded when it was 80% or more. It is also seen that the haze value was particularly low and the damage resistance is improved when the amount of MTEOS was 30% or below. The mean reflectance was especially enhanced when the amount of MTEOS is 70% or more. These effects were obtained because the organic-inorganic composite layer as the substituted metal alkoxide became rigid when a mixing ratio of MTEOS was decreased and became soft when the mixing ratio was increased. When the amount of MTEOS was increased, the reflection intensity was enhanced, because the organic group ($CH_3$) in the inorganic substance ($SiO_2$) was increased accordingly, the elasticity of the film was increased, and the emboss pattern could be transferred deeply.

Accordingly, is is preferable that the mixing ratio (molar ratio) of MTEOS to TEOS fall in a range of 20 to 80% as described above. A mixing ratio suitable for appropriate properties can be selected from the above range depending on applications of the embossed metallic flakelets.

The stainless steel base plate was used as the carrier layer in Example 1, but it was found that when a water-soluble film such as a PVA film was used, the haze value did not change but the mean reflectance was lowered by 5 to 10%. Also, when the PVA film was coated on the stainless steel base plate to prepare the carrier layer, the mean reflectance was lowered by 2 to 3% only.

Figure 7:
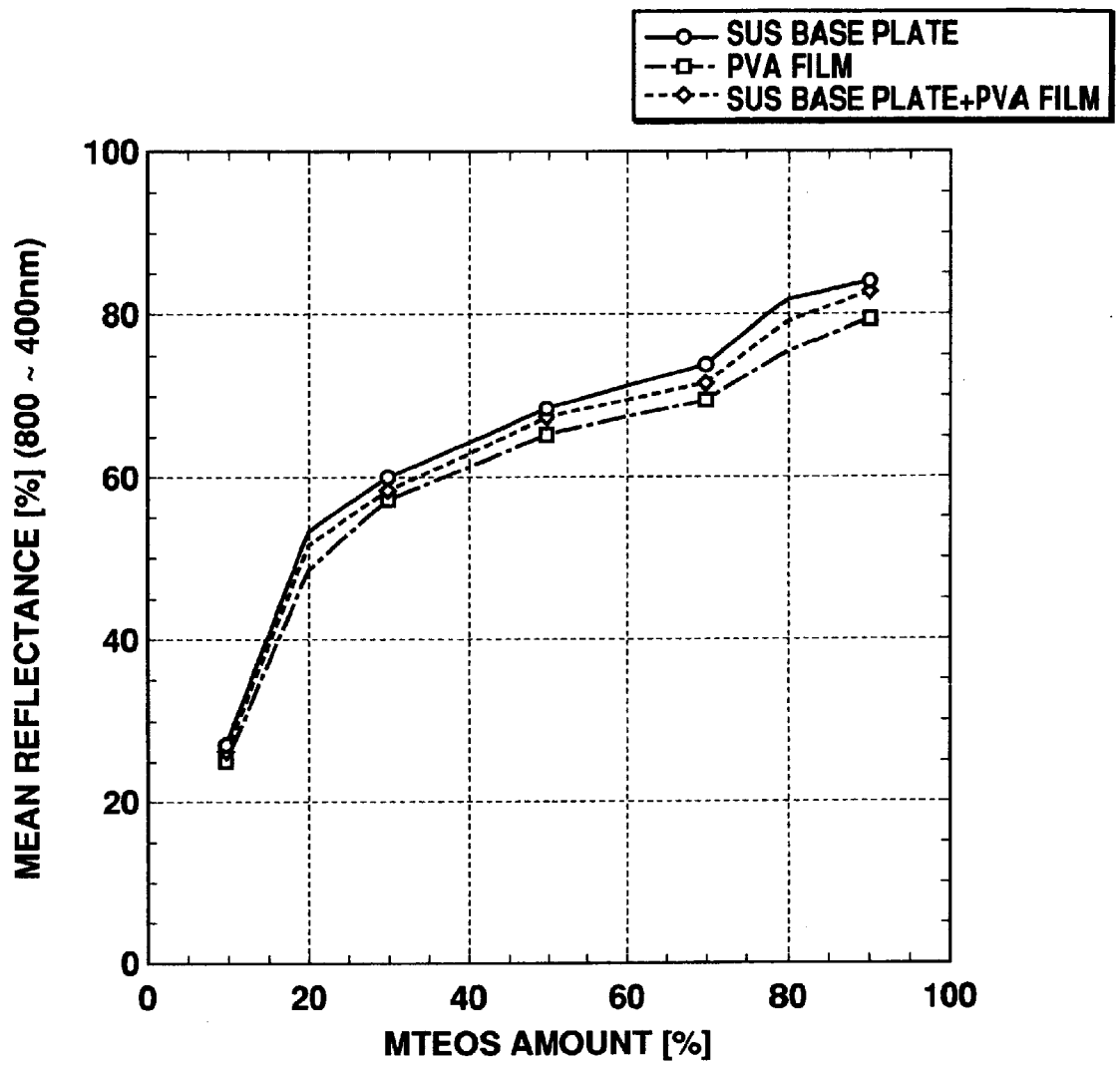
FIG. 7 is a diagram showing a relationship between an amount of MTEOS and mean reflectance with respect to a carrier layer.

FIG. 7 shows the mean reflectance of 12-degree reflections determined with respect to a mixing ratio of each MTEOS when the carrier layer was made of a stainless steel (SUS) base plate, polyvinyl alcohol (PVA), or a PVA film coated on the SUS base plate. It is apparent from FIG. 7 that the mean reflectance is slightly different depending on the carrier layer used. However, the differences indicated in the drawing are not considered to cause a problem in practical use.

EXAMPLE 3

Figure 8:
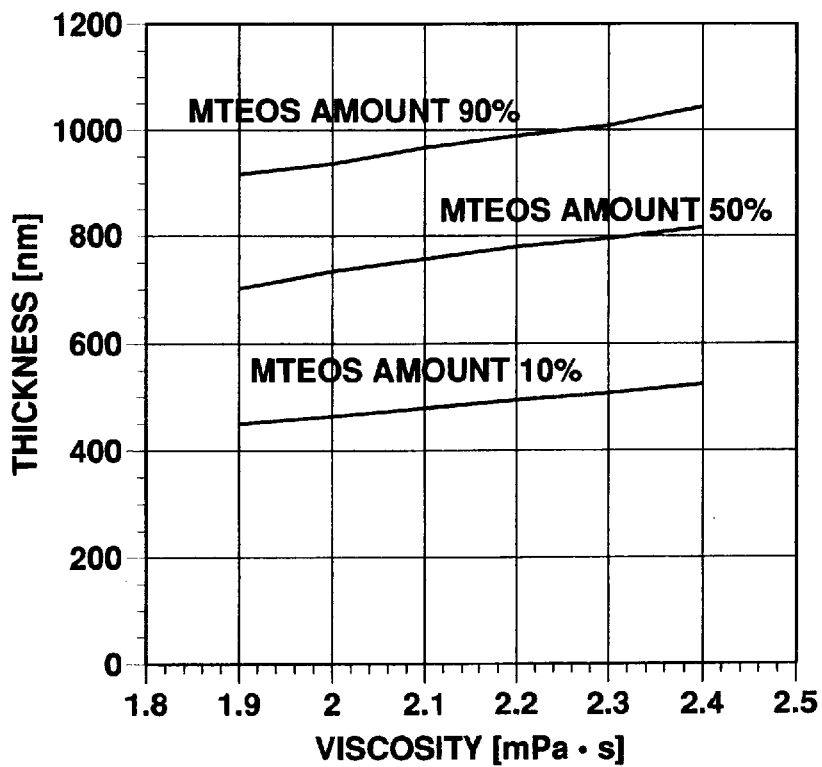
FIG. 8 is a diagram showing a relationship between the viscosity and thickness of a sol as a material for an organic-inorganic composite layer.

A sol was prepared by the same procedure as in Example 1 except that the mixing ratios of MTEOS to TEOS were changed to 10, 50, and 90%. Relationships between each viscosity of the sol and the thickness of the organic-inorganic composite layer were examined with the viscosity varied. The results obtained are shown in FIG. 8, which shows the sol viscosity on the horizontal axis and the thickness on the vertical axis. In view of the results shown in FIG. 8 and FIG. 5, the sol viscosity is preferably 2.3 mpa.s or below in order to prevent the film peeling area from becoming excessively large.

Embodiment 2

Figure 9:
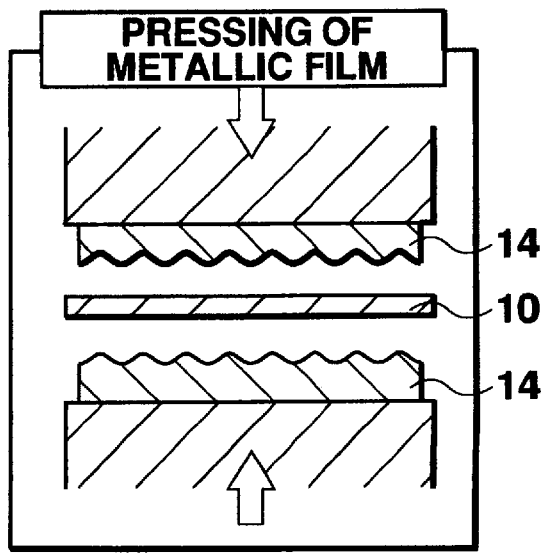
FIG. 9 is an explanatory diagram showing a step in Embodiment 2 concerning a method for producing embossed metallic flakelets according to the invention.
Figure 10:
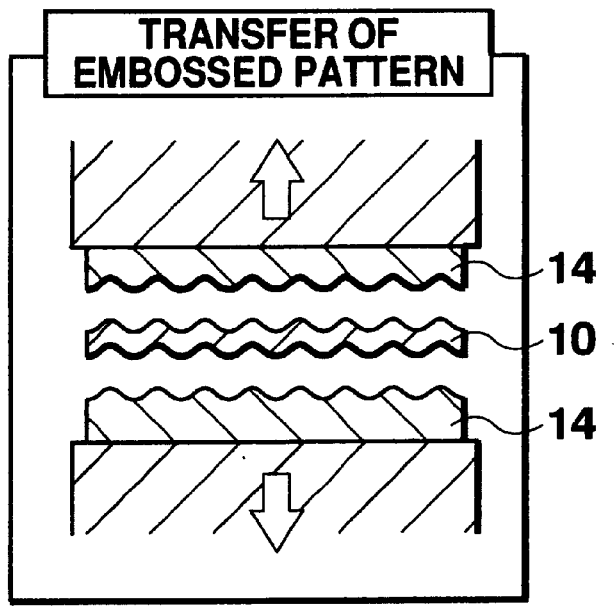
FIG. 10 is an explanatory diagram showing a step in Embodiment 2 concerning a method for producing embossed metallic flakelets according to the invention.

FIG. 9 through FIG. 13 show respective steps of Embodiment 2 concerning a method for producing embossed metallic flakelets according to the invention. As shown in FIG. 9, original embossed patterns 14 are pressed against a metallic-film 10 by pressing or rolling. Thus, embossed patterns are transferred onto the metallic film 10 as shown in FIG. 10.

Figure 11:
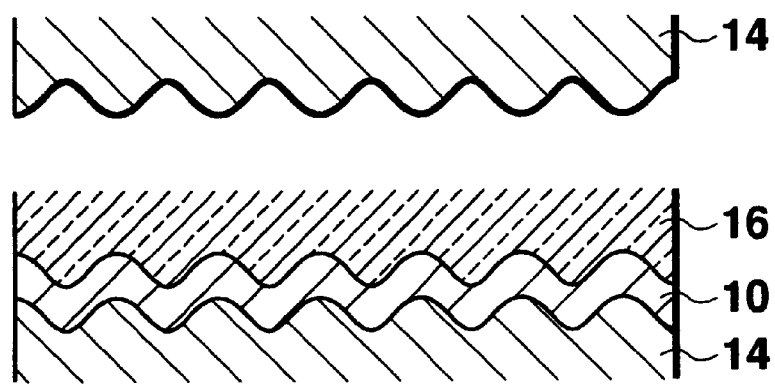
FIG. 11 is an explanatory diagram showing a step in Embodiment 2 concerning a method for producing embossed metallic flakelets according to the invention.

FIG. 11 shows that a rigid transparent coating layer 16 is formed on at least one side of the embossed metallic film 10.

The coating layer 16 may preferably be, for example, the organic-inorganic composite layer described in Embodiment 1. It may also be bifunctional or trifunctional silane as indicated below.

Bifunctional silane

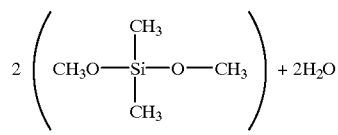

Trifunctional silane

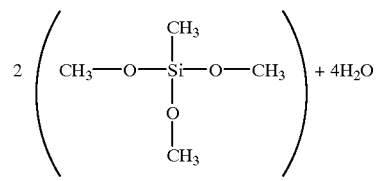

To form the coating layer 16 on the surface of the metallic film 10, the surface of the metallic film 10 may also be oxidized by irradiating ultraviolet rays. Thus, a bonding strength between the metallic film 10 and the coating layer 16 can be enhanced. Accordingly, separation of the coating layer 16 in the step of finely pulverizing the metallic film 10 can be prevented as can its warping or swelling.

Figure 12:
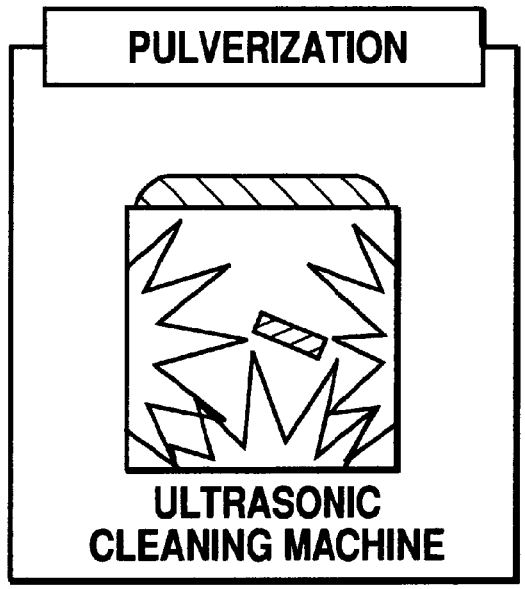
FIG. 12 is an explanatory diagram showing a step in Embodiment 2 concerning a method for producing embossed metallic flakelets according to the invention.
Figure 13:
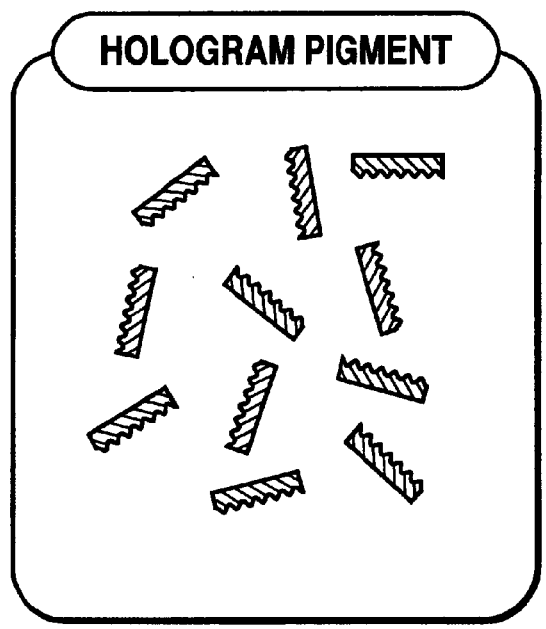
FIG. 13 is an explanatory diagram showing a step in Embodiment 2 concerning a method for producing embossed metallic flakelets according to the invention.

The metallic film 10 shown in FIG. 11 is adhered to one of the original embossed patterns 14 The metallic film 10, which has one side adhered to the original embossed pattern 14 and the other side coated with the coating layer 16, is placed in an ultrasonic cleaning machine as shown in FIG. 12. Thus, the metallic film 10 is separated from the original embossed pattern 14 and pulverized together with the coating layer 16. The finely pulverized metallic film 10 is passed through a sieve or the like to obtain the embossed metallic flakelets according to this embodiment (FIG. 13).

To form the coating layer 16 on the surface of the metallic film 10 as shown in FIG. 11, the metallic film 10 adhered to the original embossed pattern 14 is generally dipped in a coating solution such as the organic-inorganic composite solution. However, the metallic film 10 adhering from the coating solution might be deformed due to the viscosity and surface tension of the coating solution, possibly forming minute warps, swells or the like on the surface of the metallic film 10. If the metallic film 10 had such a defect, it has a disadvantage that an interference color is weakened when the metallic film 10 is used to prepare a pigment. Since the metallic film 10 is merely pressed against the original embossed pattern 14 by the pressure given for pressing, a swell is caused because small movements of the metallic film 10 cannot be prevented. To address this, a tape is applied to the pressed metallic film 10, which is adhered to the surface of the original embossed pattern 14, and peeled to separate the metallic film 10 from the original embossed pattern 14 Then, the metallic film 10 with the tape adhered can be dipped in the coating solution to form the coating layer 16 on the surface of the metallic film 10. The tape is separated from the metallic film 10 by dipping in a solvent after forming the coating layer 16. In this process, the metallic film 10 is fixed by an adhesive strength of the tape when the coating layer 16 is formed, so that the metallic film 10 can be suppressed from being warped or swelled due to the viscosity or surface tension of the coating solution. In this way, the embossed metallic flakelets can have an improved interference color.

Descriptions will be made of an example of a method for producing embossed metallic flakelets according to the above-described embodiment.

EXAMPLE 4

Two original Ni plates were disposed as the original embossed patterns 14 up and down to hold an aluminum foil having a thickness of 1 μm as the metallic film 10 therebetween. In this state, the aluminum foil was pressed by the Ni original plates under a pressure of 600 MPa at room temperature to transfer the embossed pattern onto upper and lower surfaces of the aluminum foil.

The aluminum foil having the transferred embossed patterns had an optical effect of diffraction and its surfaces had an embossed optical pattern.

As described above, the aluminum foil pressed by the Ni original plates was kept adhered to one of the original plates and dipped together in the organic-inorganic composite solution. After it was removed from the solution, a coating liquid was adhered to the surface of the aluminum foil. Then, after being kept at room temperature for one hour, the aluminum foil was heated at 80° C. for one hour to fix the coated solution as the coating layer 16.

Figure 14:
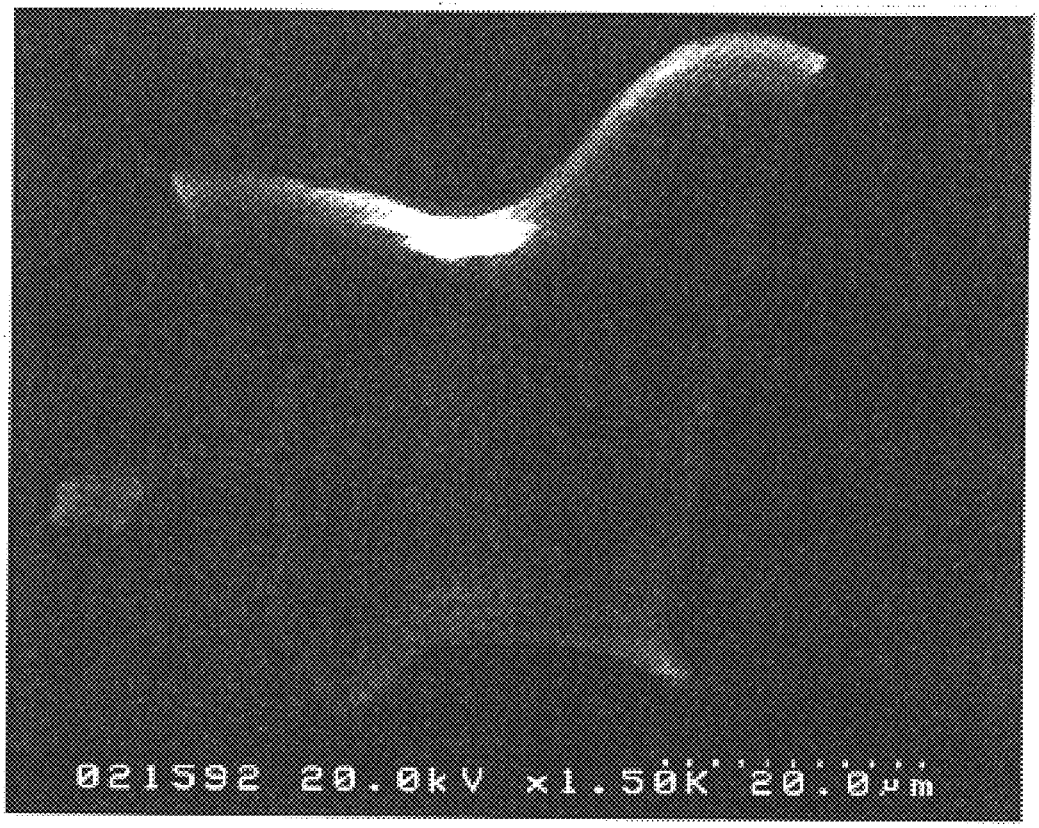
FIG. 14 is an electron micrograph of a hologram pigment produced by Embodiment 2 concerning a method for producing embossed metallic flakelets according to the invention.

The aluminum foil having the coating layer 16 formed on its surface as described above remained adhered to the Ni original plate. The aluminum foil was then dipped in acetone and exposed to ultrasonic waves in an ultrasonic cleaning machine (homogenizer) for 150 minutes. Thus, the aluminum foil was separated from the original plate and also pulverized into flakes. The aluminum flakes obtained were classified through a sieve to obtain embossed metallic flakelets (hereinafter called the "hologram pigment") having a particle diameter of 25 to 45 μm. FIG. 14 shows an electron micrograph of the pigment produced as described above. It is seen that the coating layer having a thickness of about 1 μm is coated on one side of the aluminum foil having a thickness of about 1 μm.

A clear lacquer was prepared by mixing 0.05 g of the hologram pigment prepared above, 150 cc of acrylic melamine resin and 50 cc of a thinner. The clear lacquer containing the hologram pigment was sprayed onto a color base of a painting board with a spray gun. After spraying, the coated color was fixed by keeping at 140° C. for 20 minutes. After spraying onto the painting board, respective flakes on the painting board had an optical effect of diffraction and showed the embossed diffraction pattern on their surfaces. Accordingly, the prepared painted board provided a desirable iridescent effect.

When the aluminum foil was dipped in the organic-inorganic composite solution to form the coating layer 16 on its surface in the above-described procedure, the bonding strength between the coating layer 16 and the aluminum foil was enhanced by forming the coating layer 16 after the surface of the aluminum foil was oxidized by an ultraviolet irradiation device. Therefore, separation of the coating layer 16 from the aluminum foil in the subsequent step could be suppressed. Also, when the metallic film 10 was pulverized by applying ultrasonic waves, the metallic film 10 was protected by the coating layer 16, and the hologram pigment was not warped or swelled. As a result, the interference color of the hologram pigment could be enhanced. The results are shown in Table 1.

TABLE 1

| Surface treatment | Interference color |
| --- | --- |
| Oxidizing treatment | ⊙(Very good) |
| None | ○(Good) |

Where the surface of the aluminum foil was not oxidized, a satisfactory interference color was obtained for the hologram pigment. But, the oxidation treatment of the surface of the aluminum foil additionally enhanced the interference color, which was in a very good condition as the interference color for the hologram pigment. This very good condition is indicated by ⊙ in Table 1.

When the coating layer 16 was formed on the surface of the aluminum foil as described above, warping and swelling the aluminum foil could be better prevented by fixing the aluminum foil with a tape and then dipping into the organic-inorganic composite material solution as compared to only dipping the aluminum foil kept adhered to the original plate. Results obtained when the tape was used to form the coating layer 16 are shown in Table 2.

TABLE 2

| Treatment | Interference color |
| --- | --- |
| Method using a tape | ⊙(Very good) |
| None | ○(Good) |

In Table 2, ⊙ indicates that the interference color was enhanced better than when the tape was not used and very good for the hologram pigment. It should, however, be understood that the hologram pigment produced without using the tape was judged good enough for practical use.

Embodiment 3

Figure 15:
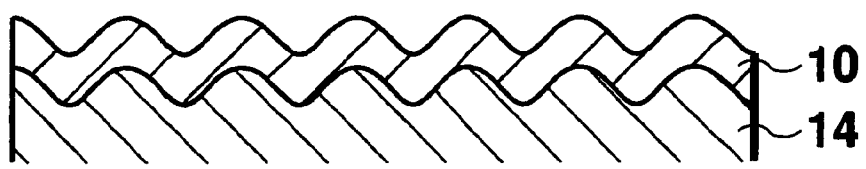
FIG. 15 is an explanatory diagram showing a step in Embodiment 3 concerning a method for producing embossed metallic flakelets according to the invention.
Figure 16:
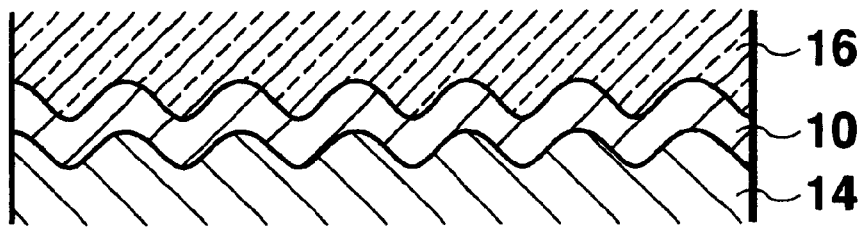
FIG. 16 is an explanatory diagram showing a step in Embodiment 3 concerning a method for producing embossed metallic flakelets according to the invention.

FIG. 15 through FIG. 18 show respective steps in Embodiment 3 concerning a method for producing embossed metallic flakelets according to the invention. FIG. 15 shows a metallic film 10 formed on the surface of an original embossed pattern 14 by plating. Thus, the embossed pattern is transferred from the original embossed pattern 14 to the metallic film 10.

A rigid transparent coating layer 16 is then formed on the metallic film 10 on the surface of the original embossed pattern 14 The coating layer 16 can be an organic-inorganic composite layer, bifunctional silane, or trifunctional silane as described in Embodiment 2. The coating layer 16 can also be formed suitably by oxidizing the surface of the metallic film 10 using ultraviolet radiation.

Figure 17:
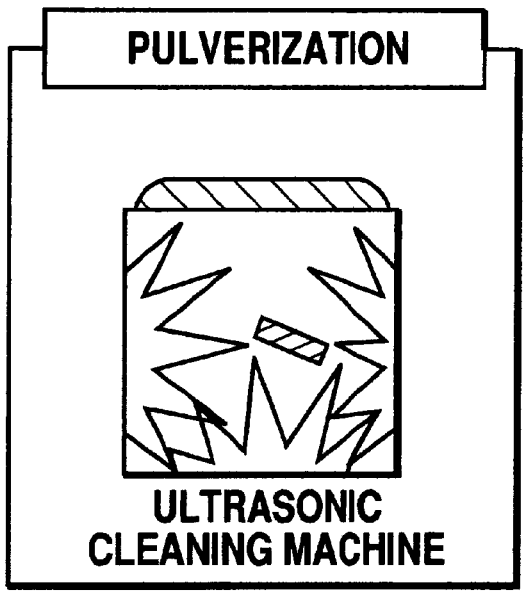
FIG. 17 is an explanatory diagram showing a step in Embodiment 3 concerning a method for producing embossed metallic flakelets according to the invention.
Figure 18:
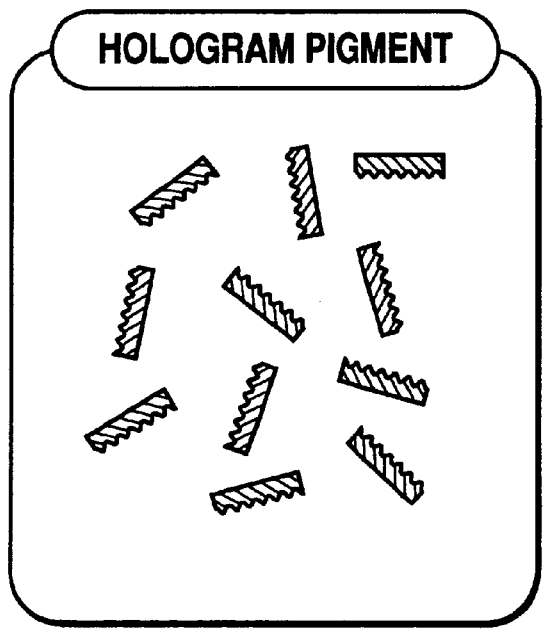
FIG. 18 is an explanatory diagram showing a step in Embodiment 3 concerning a method for producing embossed metallic flakelets according to the invention.

The metallic film 10 and the coating layer 16, which are formed on and still adhered to the original embossed pattern 14, are put in an ultrasonic cleaning machine as shown in FIG. 17. Ultrasonic waves are applied to remove the metallic film 10, which is coated on one side with the coating layer 16, from the original embossed pattern 14 and also to pulverize it. The pulverized metallic film 10 is classified though a sieve or the like to obtain a hologram pigment (FIG. 18). Thus, since at least one side of the metallic film 10 is coated with the coating layer 16, warping or swelling of the metallic film 10 during pulverizing can be prevented. As a result, an interference color of the hologram pigment can be enhanced.

In the same manner as in Embodiment 2, it is desirable to form the coating layer 16 on the surface of the metallic film 10 by applying a tape to the metallic film 10 so to remove it from the surface of the embossed pattern 14 after plating and dipping it together with the tape into the coating liquid. Thus, wrapping or swelling of the metallic film can also be prevented by the viscosity or surface tension of the coating liquid.

Descriptions will be made of an example of a method for producing embossed metallic flakelets as Example 5 according to the above-described embodiment.

EXAMPLE 5

The surface of an original Ni plate, which was embossed and was used as the original embossed pattern, was plated in a plating bath consisting of $NiSO_4 6H_2O$, $NiCl_2\ 6H_2O$, $H_3BO_4$ with the Ni original plate as the negative pole and Ni as the positive pole. Plating was performed for one minute with the plating bath at 50° C. using a current value of $2A/dm^2$ to form an Ni-plated film having a thickness of 1.0 $\mu m$ on the Ni original plate. The Ni-plated film had an optical effect of diffraction and the embossed optical pattern on the surface. Then, the Ni-plated film still adhered to the Ni original plate was dipped and pulled from the organic-inorganic composite solution, and a coating solution adhered to the surface of the Ni-plated film. After leaving at room temperature for one hour, the plate was heated at 80° C. for one hour to solidify the coating solution, thereby forming the coating layer 16.

Figure 19:
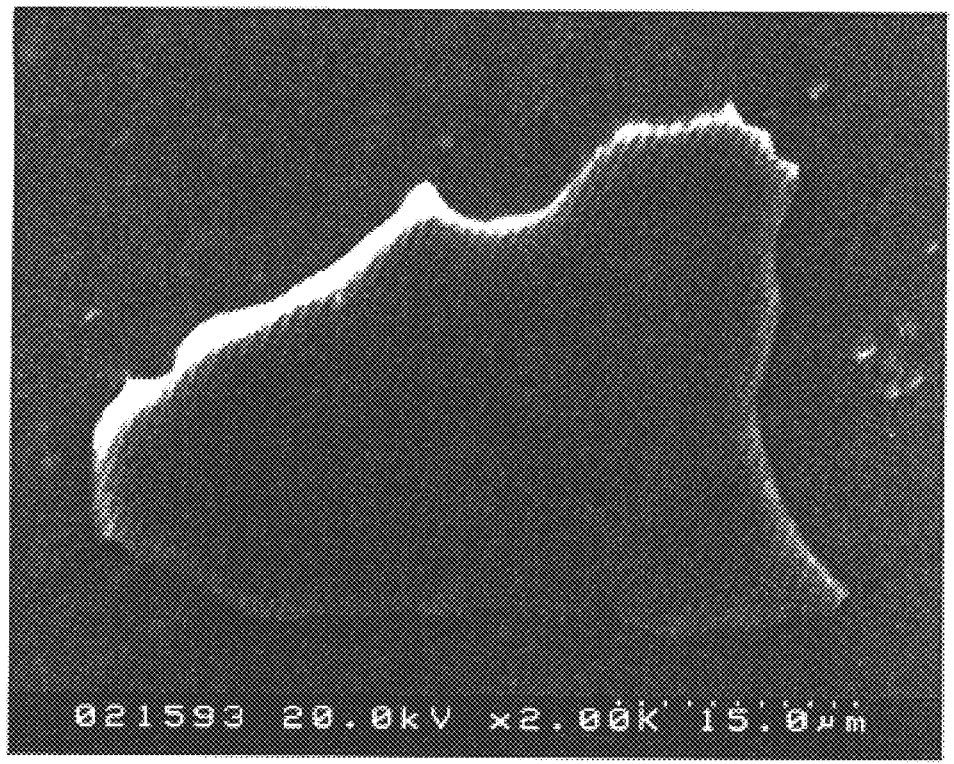
FIG. 19 is an electron micrograph of a hologram pigment produced by Embodiment 3 concerning a method for producing embossed metallic flakelets according to the invention.

The Ni-plated film with the coating layer 16 obtained as described above, still adhering to the original plate, was then dipped in acetone and exposed to ultrasonic waves by an ultrasonic cleaning machine (homogenizer). Ultrasonic waves were applied to the Ni-plated film in acetone for 5.5 hours to separate the Ni-plated film from the original plate and also to pulverize the film into flakes. The flakes were then classified using a sieve to obtain a hologram pigment having a particle diameter of 25 to 45 $\mu m$. FIG. 19 shows an electronic microphotograph of the hologram pigment obtained. Thus, it was confirmed that the coating film having a thickness of about 1 $\mu m$ was coated on one side of the Ni-plated film having a thickness of 1 $\mu m$.

A clear lacquer was prepared by mixing 0.1 g of the hologram pigment prepared above, 150 cc of acrylic melamine resin and 50 cc of a thinner. The clear lacquer containing the hologram pigment was sprayed onto a color base of a painting board with a spray gun. After spraying, the coated color was fixed by keeping it at 140° C. for 20 minutes.

After spraying onto the painting board, the paint on the painting board had an optical effect of diffraction and showed the embossed diffraction pattern on the surface. Accordingly, the prepared painted board could provide a unique iridescent effect.

Before forming the coating layer 16 on the surface of the Ni-plated film, the surface of the Ni-plated film was oxidized by ultraviolet radiation. The bonding strength between the Ni-plated film and the coating layer 16 was thus enhanced. Accordingly, separation of the coating layer 16 from the Ni-plated film in the step of finely pulverizing the Ni-plated film could be prevented, as could swelling of the Ni-plated film, so the interference color could be enhanced. These effects were the same as in Embodiment 2.

In the same manner as in Embodiment 2, by forming the coating layer 16 on the Ni-plated film after applying a tape to fix the Ni-plated film and dipping in the coating liquid, the Ni-plated film can be prevented from being warped or swelled due to the viscosity or surface tension of the coating liquid. Thus, the interference color can be enhanced.

As described above, the invention coats both sides of the metallic film having the embossed pattern with the organic-inorganic composite layer which serves as the protective layer. Thus, the metallic flakelets can be pulverized finely without losing the embossed pattern.

Both damage resistance and reflectance can be provided by adjusting the mixing ratio of the substituted metal alkoxide to the metal alkoxide.

Also, since the emboss pattern can be transferred directly onto the organic-inorganic composite layer by pressing, production is simple while, as samples can be formed on both sides of the carrier layer at the same time, production is efficient.

Embossed metallic flakelets which have an enhanced interference color can also be produced easily by a method for directly transferring the emboss pattern onto the metallic film by pressing and forming the organic-inorganic composite layer on at least one side of the metallic film.

When the adhesive tape is previously applied to fix the metallic film to form the organic-inorganic composite layer on the surface of the metallic flakelets, the metallic film can be prevented from being warped or swelled due to the viscosity or surface tension of the coating liquid during coating. Thus, the interference color can be further enhanced.

In addition, the previous oxidation of the surface of the metallic film, on which the organic-inorganic composite layer is to be coated, can improve a bonding strength between the metallic film and the organic-inorganic composite material. As a result, separation of the organic-inorganic composite layer in the pulverizing step can be prevented, warping or swelling of the metallic film can be prevented. Accordingly, the interference color can be further improved.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A method for producing embossed metallic flakelets, comprising a step of forming an embossed pattern on an organic-inorganic composite layer; a step of forming a metallic film on the embossed pattern; a step of forming an organic-inorganic composite layer on the metallic film; and a step of forming flakelets from the metallic film.

2. A method for producing embossed metallic flakelets, comprising a step of forming an embossed pattern on a metallic film; a step of forming an organic-inorganic composite layer on at least one side of the metallic film having the embossed pattern; and a step of forming flakelets from the metallic film.

3. The method for producing embossed metallic flakelets according to claim 2, wherein the step of forming the embossed pattern on the metallic film is a step of pressing an original embossed pattern onto the metallic film.

4. The method for producing embossed metallic flakelets according to claim 2, wherein the step of forming the embossed pattern on the metallic film is a step of forming a metallic film on the surface of the original embossed pattern by plating.

5. The method for producing embossed metallic flakelets according to claim 2, wherein the step of forming the organic-inorganic composite layer on at least one side of the metallic film having the embossed pattern includes a step of applying an adhesive tape to the embossed metallic film to fix the metallic film, and a step of dipping the fixed metallic film into an organic-inorganic composite solution to form the organic-inorganic composite layer on the metallic film.

6. The method for producing embossed metallic flakelets according to claim 2, wherein the step of forming the organic-inorganic composite layer on at least one side of the metallic film having the embossed pattern includes a step of oxidizing the surface of the embossed metallic film, and a step of forming an organic-inorganic composite layer on the oxidized surface.

7. The method for producing embossed metallic flakelets according to claim 1, wherein the step of forming comprises pulverizing the metallic film.

8. The method for producing embossed metallic flakelets according to claim 2, wherein the step of forming comprises pulverizing the metallic film.

* * * * *

UNITED STATES PATENT AND TRADEMARK OFFICE
CERTIFICATE OF CORRECTION

PATENT NO. : 6,112,388
DATED : September 5, 2000
INVENTOR(S) : Hiroyuki KIMOTO et al.

It is certified that error appears in the above-indentified patent and that said Letters Patent is hereby corrected as shown below:

[75] Inventors:

Please change the spelling of the second inventor from "MASATUGU" to --MASATSUGU--.

Signed and Sealed this

Seventeenth Day of April, 2001

Attest:

NICHOLAS P. GODICI

Attesting Officer     Acting Director of the United States Patent and Trademark Office